No. 612,377. Patented Oct. 11, 1898.
J. B. BRITE.
JOINTED FRAME GANG PLOW.
(Application filed July 26, 1897.)
(No Model.)
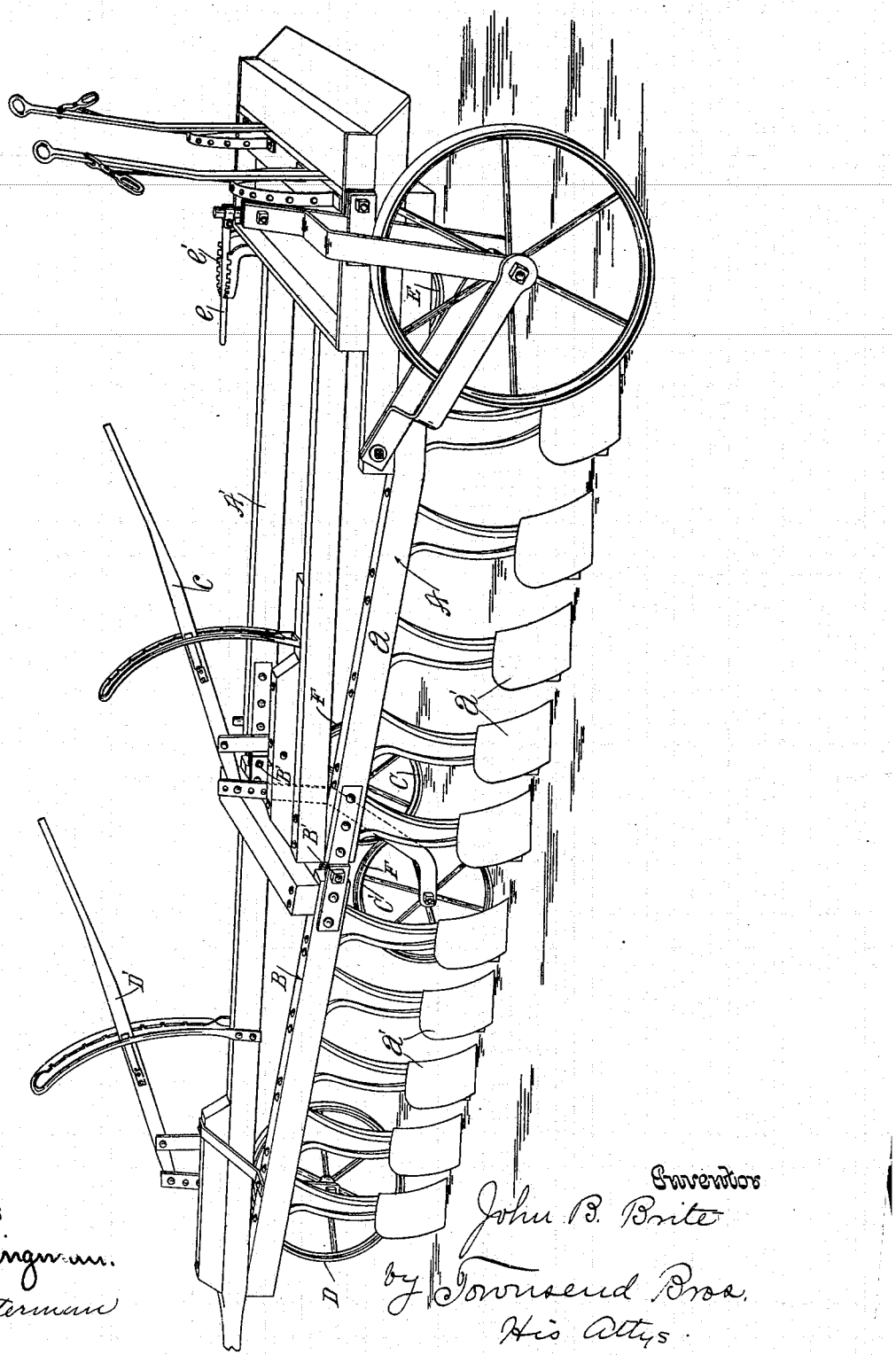
Witnesses
Perry Ringw...
E. A. Waterman
Inventor
John B. Brite
by Townsend Bros.
His Attys.

UNITED STATES PATENT OFFICE.

JOHN B. BRITE, OF TEHACHAPI, CALIFORNIA, ASSIGNOR OF ONE-HALF TO J. W. JAMESON, OF SAME PLACE.

JOINTED-FRAME GANG-PLOW.

SPECIFICATION forming part of Letters Patent No. 612,377, dated October 11, 1898.

Application filed July 26, 1897. Serial No. 646,033. (No model.)

*To all whom it may concern:*

Be it known that I, JOHN B. BRITE, a citizen of the United States, residing at Tehachapi, in the county of Kern and State of California, have invented a new and useful Jointed-Frame Gang-Plow, of which the following is a specification.

In California and in many other regions in which there are large level plains of land suitable for grain it is the common practice to plow the soil by means of gang-plows. In California the plow is generally known as the "Stockton" gang, and in ordinary use these gangs consist of five plows each. It has been attempted heretofore to make gangs containing more than five plows; but unless the land is extremely level such plows cannot be used successfully, for the reason that the plows only plow the high places, leaving the depressions therebetween entirely unstirred. It is desirable from point of economy that a larger number of plows be employed in a gang, since one driver can attend to a gang of ten plows as well as he can attend to a gang of five plows. Thus by my invention only half as many men are required as formerly.

The object of my invention is to produce a gang-plow with which ten plows may be used in a gang and the work done even more effectively than can be done with the gang-plows now in use, in which but only five plows can be used.

My invention comprises the various features of construction and combinations of parts hereinafter fully set forth and claimed.

The accompanying drawing illustrates my invention.

The sole figure is a perspective side elevation of a ten-gang plow embodying my invention.

In the drawing, A represents a front triangular frame, along one side of which a are secured the plows a'. Upon the other side of the frame is secured an extension-frame A', which is rectangular in shape and equal in width to the front end of the triangular frame A and extends back even with the rear end of such frame. Hinged to the rear end of the frames A and A' by hinge-bolts B' is a second triangular frame B, which is also provided with five plows, the same as the frame A.

Bearing-wheels C and C' are arranged supporting the frame at the joint, thereby causing the plows to follow the inequalities of the soil and to take practically the same depth of soil irrespective of elevations and depressions. By means of a lever c the bearing-wheel C' is rendered vertically adjustable, so as to gage the depth to which the plows enter the soil. The rear supporting-wheel D is also rendered adjustable by means of a lever D', and a bearing-wheel E upon the outer side of the frame A' is provided with a lever e, which engages with the arc rack e' to guide the gang in the desired direction. The bearing-wheels are each provided with a sharp ridge or intake F, as shown in the drawing, which enters the soil and prevents the gang from slipping downward when used upon a side hill.

In practice the bearing-wheels are adjusted to allow the wheels to enter the soil to the required depth, and the gang is then drawn forward by the animals, the joint in the frame allowing the supporting-wheels and the plows to readily follow any inequalities in the surface of the soil and causes the device to plow knolls and depressions with equal facility.

By jointing the frame near its mid-length the two sections mutually steady and hold each other down to the work, avoiding all jumping and skipping, which often occurs with the five-gang plows.

Now having described my invention, what I claim as new, and desire to secure by Letters Patent, is—

1. In a gang-plow, the combination set forth of the front triangular frame having the plows arranged along one side thereof, and an extension-frame arranged upon the other side thereof, and the rear triangular frame hinged to the rear end of the front triangular frame and the extension-frame and having plows arranged along one side.

2. In a gang-plow, the combination set forth of the front triangular frame having the plows arranged along one side thereof; and an extension-frame arranged upon the other side thereof, the rear triangular frame hinged to the rear end of the front triangular frame and the extensoin-frame, and having plows arranged along one side; and supporting-wheels arranged supporting the joint.

JOHN B. BRITE.

Witnesses:
W. L. BRITE,
J. W. JAMESON.